United States Patent [19]

Kawai et al.

[11] Patent Number: 4,480,065
[45] Date of Patent: Oct. 30, 1984

[54] POLYPROPYLENE-BASE RESIN COMPOSITION

[75] Inventors: Yoichi Kawai; Yoshihisa Gotoh, both of Yokohama; Masami Maki, Kawasaki; Akio Yoshihara, Yokohama; Minoru Hoshino, Kawasaki; Katsumi Sekiguchi, Yokohama, all of Japan

[73] Assignee: Mitsui Toatsu Chemicals, Incorporated, Tokyo, Japan

[21] Appl. No.: 495,255

[22] Filed: May 17, 1983

[30] Foreign Application Priority Data

Jun. 4, 1982 [JP] Japan ................... 57-94765

[51] Int. Cl.³ .............. C08K 3/00; C08K 00/00; C08L 23/16; C08L 53/00
[52] U.S. Cl. ................... 524/418; 524/420; 524/423; 524/424; 524/425; 524/426; 524/433; 524/437; 524/445; 524/451; 524/456; 524/494; 524/505; 525/88
[58] Field of Search ........... 525/88; 524/494, 505, 524/426, 425, 445, 423, 437, 451, 456, 418, 424, 433, 420

[56] References Cited

U.S. PATENT DOCUMENTS 3,906,056  9/1975  Okamoto et al. ............... 525/88
4,319,004  3/1982  Spielav et al. ................. 525/88
4,363,885  12/1982  Fukui et al. ................... 524/505

FOREIGN PATENT DOCUMENTS 57-159842  10/1982  Japan ........................... 524/505
2085452     9/1980  United Kingdom .
2097408    11/1982  United Kingdom ........... 524/505
69479       1/1983  United Kingdom .

OTHER PUBLICATIONS

Derwent Abst. 23775 K/10 (J58015544) TOA Jan. 1983.
Derwent Abst. 01454 K/01 (J57190031) Nippon Zeon, Nov. 1982.
Derwent Abst. 16596 E/09 (J57012046) Mitsubishi, Jan. 1982.
Derwent Abst. 03965 E/03 (BE-890172) Idemitsu (Jan. 1982).
Derwent Abst. 12789B/07 (J54001386) Nippon (Jan. 1979).
Derwent Abst. 46867 E/23 (J57070141) Mitsubishi (Apr. 1982).

Primary Examiner—Herbert J. Lilling
Attorney, Agent, or Firm—Fisher, Christen & Sabol

[57] ABSTRACT

A polypropylene-base resin composition which comprises:
(a) 80–60 wt. % of a crystalline ethylenepropylene block copolymer having an ethylene content of 11–30 wt. % and specific physical data;
(b) 5–35 wt. % of an ethylene-propylene copolymer rubber having a propylene content of 20–50 wt. % and a specific Mooney viscosity;
(c) 5–35 wt. % of an ethylene-propylene-a specific diene terpolymer having a propylene content of 20–50 wt. % and a specific Mooney viscosity; and
(d) 2–5 wt. %, based on the total weight of the above resin components (a), (b) and (c), of an inorganic filler having a particle size of 3 μm or smaller.

The composition has excellent paintability and high stiffness, impact resistance and molding fluidity.

5 Claims, No Drawings

POLYPROPYLENE-BASE RESIN COMPOSITION

BACKGROUND OF THE INVENTION (1) Field of the Invention

This invention relates to a polypropylene-base resin composition having excellent paintability and high stiffness, impact resistance and molding fluidity.

(2) Description of the Prior Art

Polypropylene resin has now found widespread commercial utility owing to its low specific gravity, high stiffness and superb heat and chemical resistance. In the beginning, polypropylene resin was however unsuitable for use at low temperatures, because of its poor impact resistance at such low temperatures. Polypropylene resins of the impact resistant grade, which are obtained by copolymerizing ethylene and propylene, have been developed and put on the market as polypropylene resins usable at low temperatures. However, polypropylene resins have recently been required to exhibit still higher performance and the impact resistance of such a degree as the impact resistant grade has been found to be insufficient in some applications. In the field of automobile bumpers, bumper skirts, trims, etc. for example, there is a demand for resins having mutually-contradictory properties such as high stiffness, high heat resistance and easy paintability as well as, at the same time, high impact resistance. High molding fluidity is further required especially in the case of bumpers, reflecting the recent move toward larger moldings.

Various approaches have thus been proposed to improve the impact resistance and paintability of propylene resins. Japanese Patent Laid-open No. 47344/1982 discloses a polypropylene-base resin composition consisting of 50-97 wt.% of a crystalline ethylene-propylene block copolymer and 50-3 wt.% of an elastic ethylene-propylene-diene terpolymer having a Mooney viscosity($ML_{1+4}$, 100° C.) of 70-150. Japanese Patent Laid-open No. 55952/1982 discloses a polypropylene composition suitable for use in the fabrication of bumpers, which composition consists of 55-65 wt.% of a crystalline ethylene-propylene block copolymer having an ethylene content of 5-10 wt.%, polypropylene units insoluble in boiling n-heptane of 97 wt.% or more, units soluble in para-xylene of room temperature having an intrinsic viscosity of 3-4 as measured in decaline (135° C.), and a melt flow index of 2-10; 30-35 wt.% of an amorphous ethylene-propylene copolymer having an intrinsic viscosity of 2.0-3.5 as measured in decaline (135° C.) and a Mooney viscosity($ML_{1+4}$, 100° C.) of 40-100; and 5-15 wt.% of talc having an average particle size of 0.5-5 μm. On the other hand, Japanese Patent Laid-open No. 70141/1982 discloses a propylene-base polymer composition consisting of (a) 30-85 wt.% of a crystalline propylene polymer; (b) 5-50 wt.% of an ethylene-propylene copolymer rubber; and (c) 5-30 wt.% of precipitated or wet-ground heavy, fine calcium carbonate particles having an average particle size of 0.05-1.0 μm.

Such resin compositions containing impact resistance improvers incorporated therein are however accompanied by drawbacks. Their stiffness, heat resistance and molding fluidity have been lowered although their impact resistance and paintability have certainly been improved.

It is also commonly practiced to add an inorganic filler with a view toward improving the stiffness of polypropylene resin. According to this method, the stiffness is enhanced and the heat resistance is improved as the proportion of such an inorganic filler is increased. However, it has been known that an addition of such a filler, on the other hand, leads to a considerable reduction in impact resistance. For example, it is disclosed in "Engineering Materials", Vol. 20, No. 7, Page 29 (1972) that the Izod impact strength of polypropylene decreases as more talc is added although its stiffness and heat distortion temperature are improved. It is also disclosed in "Plastics", Vol. 17, No. 12, Page 27 (1966) that the Izod impact strength of polypropylene is lowered when diatomaceous earth, calcium carbonate, talc or asbestos is added thereto. Incidentally, the inorganic fillers used in the abovementioned methods are of those employed routinely and no special attention has been paid to their particle sizes.

SUMMARY OF THE INVENTION

An object of this invention is to provide a propylene-base resin composition having excellent paintability, high stiffness and impact resistance, as well as high molding fluidity.

The present inventors carried out various investigations as to using both an inorganic filler and an impact resistance improver such as an ethylene-propylene copolymer rubber (hereinafter abbreviated as "EPM") or EPM and ethylene-propylene-diene terpolymer rubber (hereinafter abbreviated as "EPDM") in combination to enhance the stiffness of polypropylene resin and, at the same time, to improve its paintability and impact resistance. Routinely-employed inorganic fillers having particle sizes of 5-150 μm however lowered the impact resistance of polypropylene resin as their proportions were increased, similar to the results reported in the above-referred to literatures, and thus failed to improve both stiffness and impact resistance at the same time.

With a view toward achieving the above-described object of this invention, the present inventors expanded their research. As a result, it has been surprisingly found that the paintability, stiffness and impact resistance of polypropylene resin can be significantly improved and its molding applicability can also be made better by incorporating a specific crystalline ethylene-propylene block copolymer, EPM and EPDM as well as an inorganic filler having a specific particle size at specific proportions.

The present invention thus provides a polypropylene-base resin composition which comprises:

(a) 80-60 wt.% of a crystalline ethylene-propylene block copolymer having an ethylene content of 11-30 wt.%, polypropylene units insoluble in boiling n-heptane of 75 wt.% or more, an intrinsic viscosity of 1.2-2.0 as measured as a tetraline solution (135° C.) and a melt flow index of 8 or greater;

(b) 5-35 wt.% of an ethylene-propylene copolymer rubber having a propylene content of 20-50 wt.% and a Mooney viscosity($ML_{1+4}$, 100° C.) of 20-100;

(c) 5-35 wt.% of an ethylene-propylene-diene terpolymer having a propylene content of 20-50 wt.% and a Mooney viscosity($ML_{1+4}$, 100° C.) of 20-110, said diene being ethylidene norbornene, dicyclopentadiene or 1,4-hexadiene; and (d) 2-5 wt.%, based on the total weight of the above resin components (a), (b) and (c), of an inorganic filler having a particle size of 3 μm or smaller.

DETAILED DESCRIPTION OF THE INVENTION

The crystalline ethylene-propylene block copolymer useful in the practice of this invention has an ethylene content of 11–30 wt.%, polypropylene units insoluble in boiling n-heptane of 75 wt.% or more with 75-nearly 100 being preferred, an intrinsic viscosity of 1.20–2.0 as measured as a tetraline solution (135° C.), and a melt flow index of 8 or greater with 8–80 being preferred. If the above ethylene content should be less than 11 wt.%, the paintability, especially the initial adherence of a resulting molding will be reduced. On the other hand, any ethylene contents greater than 30 wt.% will render the modulus of flexural elasticity of a resulting molding smaller than 9000 kg/cm$^2$. If the polypropylene units insoluble in boiling n-heptane should be less than 75 wt.%, the resulting molding will have a modulus of flexural elasticity smaller than 9000 kg/cm$^2$. Any intrinsic viscosities smaller than 1.20 as measured as the tetraline solution (135° C.) will result in that the Izod impact strength of the resulting molding be smaller than 10 kg.cm/cm at −40° C. On the other hand, any intrinsic viscosities greater than 2.0 will result in polypropylene compositions each having a melt flow index smaller than 6 g/10 min. If the above melt flow index should be smaller than 8, the melt flow index of the resulting polypropylene composition will be smaller than 6 g/10 min. If any of the above-described properties is outside its respective range also specifically defined above, the stiffness, impact resistance and molding fluidity of a resulting polypropylene composition will be too low.

EPM useful in the practice of this invention is limited to that having a propylene content of 20–50 wt.% and a Mooney viscosity(ML$_{1+4}$, 100° C.) of 20–100. Similarly, EPDM is also limited to that having a propylene content of 20–50 wt.% and a Mooney viscosity(ML$_{1+4}$, 100° C.) of 20–110 and containing either one of the ethylidene norbornene, dicyclopentadiene and 1,4-hexadiene as the third component, i.e., the diene. These limitations are essential to the present invention, because lower glass transition temperatures (hereinafter abbreviated as "T$_g$"), of EPM and EPDM are effective for the improvement of the impact resistance of polypropylene-base resins and certain optimum ranges are present regarding the molecular weights of EPM and EPDM to be used.

It has been known that T$_g$ of each of EPM and EPDM reaches the minimum in a region where the propylene concentration ranges from 15 mole % to 40 mole %. The above concentration range of propylene is equivalent to a propylene content range of 20–50 wt.%. When rubber is incorporated in a resin to improve its impact resistance, it is known that there is an optimum value as to the size of dispersed rubber particles. Similarly, an optimum particle size is also present in a system of a polypropylene resin and EPM and/or EPDM. If the molecular weights of EPM and EPDM should be too small, the sizes of their dispersed particles will be smaller than their optimum values, whereas excessively great molecular weights of EPM and EPDM will result in particle sizes greater than their respective optimum values. Accordingly, both of the above molecular weights are preferred. The molecular weights of EPM and EPDM, which can provide the optimum values as to dispersed particles sizes, are 20–100 for EPM and 20–110 for EPDM as defined in terms of Mooney viscosity(ML$_{1+4}$, 100° C.) which is correlated with molecular weight.

In the present invention, it is preferred to employ granular EPM and EPDM as they facilitate the compounding work. As exemplary granular EPM, may be mentioned Toughmer P0180, Toughmer P0280, Toughmer P0480 and Toughmer P-680(trade names; products of Mitsui Petrochemical Industries, Ltd.) and EP02P and EP07P(trade names; products of Japan E.P. Rubber Co., Ltd.).

It is possible to improve, in the present invention, all the paintability, impact resistance and molding fluidity by using EPM and EPDM in combination. The proportions of EPM aand EPDM should each lie within the range of 5–35 wt.% and their total proportion may usually range from 20 wt.% to 40 wt.%. If the total proportion of EPM and EPDM should be smaller than 20 wt.%, they cannot bring about their impact resistance and paintability improving effects to any significant extents and the −40° C. Izod strength of the resulting molding will be smaller than 10 kg.cm/cm. Therefore, it is not preferred to use EPM and EPDM at such a small total proportion. On the other hand, any total proportions of EPM and EPDM in excess of 40 wt.% will lower the molding fluidity and stiffness of resulting polypropylene compositions and are thus not preferred. Furthermore, EPM cannot provide any significant improvement to the paintability when incorporated at a proportion smaller than 5 wt.%. If EPDM should be added at a proportion smaller than 5 wt.%, its impact resistance improving effect will be small and the −40° C. Izod impact strength of a resulting molding will be lower than 10 kg.cm/cm. Accordingly, it is not preferred to use EPM and EPDM at such low properties.

The inorganic filler useful in the practice of this invention is an inorganic and powdery filler suitable for use in resins. As illustrative inorganic fillers, may be mentioned calcium oxide, magnesium oxide, calcium hydroxide, magnesium hydroxide, aluminum hydroxide, calcium carbonate, magnesium carbonate, basic magnesium carbonate, calcium silicate, magnesium silicate, calcium sulfate, barium sulfate, calcium sulfite, talc, clay, glass, dolomite, pirssonite, etc., with calcium carbonate, barium sulfate, calcium silicate and talc being particularly preferred.

It is essential that the particle size of the inorganic filler used in this invention be 3 μm or smaller. A particle size of 2 μm or smaller is particularly preferred. If an inorganic filler having a particle size greater than 3 μm should be used, the impact resistance of the resulting polypropylene resin composition will be poor.

Here, the particle size of such an inorganic filler is supposed to be that defined by a method commonly employed in the art. There are various definitions as to particle sizes, including Green's or Feret's particle size, Goebelein's particle size, Nussenstein's particle size and Stoke's particle size. Particle sizes may be measured in accordance with a variety of measurement methods as given in the "Chemical Industry Handbook". The term "particle size" as used herein means the Nussenstein's particle size which is determined by the photo-extinction method. Measurement of particle sizes may be carried out using, for example, a photo-extinction particle size distribution analyzer Model SKC 2000 (manufactured by Seishin Kigyo Company). As a particle size, the particle size corresponding to 50% of a cumulative particle size distribution (generally called "D$_{50}$") may be used. Incidentally, the majority of inorganic fillers generally available in the market have particle sizes in the range of from 5 μm to 150 μm. Different from such conventional inorganic fillers, it is necessary to use, in the present invention, an inorganic filler whose particle size has been reduced to 3 μm or smaller using a special superfine grinding machine, for example, JET-O-MIZER Model 0202.

The proportion of the inorganic filler having a particle size of 3 μm or smaller to be added in the present invention should range from 2 wt.% to 5 wt.% based on the resin components of the crystalline ethylene-propylene block copolymer, EPM and EPDM. Any proportions smaller than 2 wt.% are too small to bring about the stiffness-improving effect of the filler to a significant extent. Thus, it is not preferred to use the filler at such small proportions. Stiffness and impact resistance may both be improved as the proportion of an inorganic filler is increased up to about 15 parts by weight. However, the paintability is reduced and preliminary drying of resin is indispensable upon molding same, if the inorganic filler is incorporated at such a high proportion. Therefore, it is necessary to set the upper limit of the proportion at a much lower level. Namely, if an inorganic filler should be added at a proportion exceeding 5 wt.%, it will be necessary to subject a resulting resin composition to preliminary drying because the resin will cause silver streaks to appear on a surface of a molding due to the hygroscopicity of the inorganic filler. If the inorganic filler should be added in excess of 5 wt.%, the initial adherence will be improved among the paintability but the resistance of a resulting resin composition to warm water and moisture will, on the contrary, be reduced because the inorganic filler distributed in the resin composition will be allowed to absorb moisture and thus to develop swells between the resin layer and coating layer. Therefore, it is not preferred to use the inorganic filler at such a high proportion.

The mixing of the various components used in the polypropylene composition of this invention may be carried out using any means commonly employed in the art, for example, a single-screw extruder or a double-screw extruder such as FCM, CIM or the like. When producing the above composition, it is possible to incorporate one or more antioxidants, ultraviolet absorbents, metal deterioration preventives, lubricants, antistatic agents, defoaming agents and/or the like which are routinely employed in polypropylene resins.

The polypropylene-base resin composition according to this invention has high stiffness, impact resistance and molding fluidity as well as excellent paintability (i.e., initial adherence, warm water resistance and moisture resistance). Namely, the above polypropylene-base resin composition has a modulus of flexural elasticity of 9000 kg/cm$^2$ or higher, a $-40°$ C. Izod impact strength of 10 kg.cm/cm and a melt flow index of 6 g/10 min. It exhibited excellent performance in an initial adherence test and warm water resistance test, which pertain to paintability and will be described later in this specification. Accordingly, the resin composition may be applied for the fabrication of automobile bumpers, bumper skirts, trims, motorcycle fenders, etc. It may be molded by various molding methods, such as the injection molding method, extrusion molding method, and compression molding method.

The invention will hereinafter be described more specifically in the following Examples, in which melt flow indexes, moduli of flexural elasticity and Izod impact strengths were measured in accordance with ASTM D-1238, ASTM D-790 and ASTM D-256 respectively.

EXAMPLE 1

Compounded were 65 wt. parts of a crystalline ethylene-propylene block copolymer (hereinafter abbreviated as "PP-A") having the ethylene content of 26.0 wt.%, polypropylene units insoluble in boiling n-heptane of 80.6 wt.%, the intrinsic viscosity of 1.7 as measured as a tetraline solution (135° C.) and the melt flow index of 20; 25 wt. parts of Toughmer P0280 (trade name; EPM produced by Mitsui Petrochemical Industries, Ltd.) having the Mooney viscosity (ML$_{1+4}$, 100° C.) of 21; and 10 wt. parts of EP57P (trade name; EPDM produced by Japan E.P. Rubber Co., Ltd.) having the propylene content of 28 wt. parts and the Mooney viscosity (ML$_{1+4}$, 100° C.) of 85 and containing ethylidene norbornene as the third component; as well as talc having the particle size of 1.8 μm, as an inorganic filler, at proportions respectively given in Table 1. They were mixed in a Henschel mixer and then formed into pellets through an extruder. The thus-obtained pellets were formed into specimens by means of an injection-molding machine and their moduli of flexural elasticity and Izod impact strengths were measured. On the other hand, their paintability were evaluated in accordance with the following method. Namely, a two-liquid type priming paint of the acrylic component-chlorinated polypropylene system was coated to the film thickness of 10 μm over each of the specimens which were obtained using the above injection-molding machine. Thereafter, a two-liquid type top-coating paint of the acrylic component-urethane system was applied to the thickness of 25 μm over the primed specimen. After drying the thus-primed and top-coated specimen at 90° C. and for 30 minutes, it was allowed to stand at room temperature for 24 hours, thereby obtaining a specimen useful in a paintability test. Using a cutter, a grid pattern of 100 1-mm squares was cut through the coating of the specimen. After applying an adhesive tape over the cross-hatched area, it was quickly pulled off. The ratio of remaining squares of the coating was determined in terms of percentage, on which the initial adherence was evaluated. Besides, specimens useful in the paintability test were immersed for 240 hours in warm water of 40° C. and their warm water resistance was then evaluated by observing the state of the surfaces of the coatings and subjecting them to the grid-patterned pulling-off test.

Furthermore, after allowing the above-obtained pellets to stand for one week in an atmosphere of 30° C. and 90% R.H., they were formed into plates of 160 mm long, 80 mm wide and 2 mm thick by means of an injection-molding machine. Surfaces of the resulting moldings were observed. The melt flow indexes of the thus-obtained polypropylene resins, moduli of flexural elasticity and Izod impact strengths measured on the specimens, evaluation results of the paintabilities of the specimens and surface conditions of the moldings are all given in Table 1.

EXAMPLES 2-3

The procedures of Example 1 were repeated except that a crystalline ethylene-propylene copolymer (hereinafter abbreviated as "PP-B") having the ethylene content of 16.1 wt.%, polypropylene units insoluble in boiling n-heptane of 86.4 wt.%, the intrinsic viscosity of 1.4 as measured as a tetraline solution (135° C.) and the melt flow index of 47 or a crystalline ethylene-propylene copolymer (hereinafter abbreviated as "PP-C") having the ethylene content of 11.6 wt.%, polypropylene units insoluble in boiling n-heptane of 77.1 wt.%, the intrinsic viscosity of 1.3 as measured as a tetraline solution (135° C.) and the melt flow index of 70 was used in place of PP-A. Test results are given in Table 1.

COMPARATIVE EXAMPLES 1-2

The procedures of Example 1 were followed except that, in lieu of PP-A, a crystalline ethylene-propylene block copolymer (hereinafter abbreviated as "PP-D") having the ethylene content of 6.8 wt.%, polypropylene units insoluble in boiling n-heptane of 93.8 wt.%, the intrinsic viscosity of 2.1 as measured as a tetraline solution (135° C.) and the melt flow index of 4 or a crystalline ethylene-propylene block copolymer (hereinafter abbreviated as "PP-E") having the ethylene content of 5.6 wt.%, polypropylene units insoluble in boiling n-heptane of 94.0 wt.%, the intrinsic viscosity of 1.9 as measured as a tetraline solution (135° C.) and the melt flow index of 8 was used. Test results are given also in Table 1.

mer P0280 as an EPM; 10 wt. parts of the above-described EP57P as an EPDM; and, as inorganic fillers, talc having the particle size of 1.8 μm, barium sulfate having the particle size of 1.2 μm, calcium carbonate having the particle size of 1.9 μm and calcium silicate having the particle size of 1.0 μm at proportions respectively given in Table 2. Tests were carried out in the same manner as in Example 1. Test results are shown in Table 2.

COMPARATIVE EXAMPLE 3

A test was carried out in the same manner as in Example 4 except that the inorganic filler was not added. Test results are given in Table 2.

COMPARATIVE EXAMPLES 4-7

The procedures of Example 4 were repeated except that the proportion of the talc having the particle size of 1.8 μm was varied to 1, 7, 15 and 20 parts by weight respectively. Test results are summarized also in Table 2.

COMPARATIVE EXAMPLES 8-10

TABLE 1

|  |  | Example | | | Comparative Example | |
|---|---|---|---|---|---|---|
|  | Unit | 1 | 2 | 3 | 1 | 2 |
| Composition |  |  |  |  |  |  |
| PP-A | wt. parts | 65 |  |  |  |  |
| PP-B | wt. parts |  | 65 |  |  |  |
| PP-C | wt. parts |  |  | 65 |  |  |
| PP-D | wt. parts |  |  |  | 65 |  |
| PP-E | wt. parts |  |  |  |  | 65 |
| EPM Toughmer P0280 | wt. parts | 25 | 25 | 25 | 25 | 25 |
| EPDM EP57P | wt. parts | 10 | 10 | 10 | 10 | 10 |
| Talc (particle size: 1.8 μm) | wt. parts | 5 | 5 | 5 | 5 | 5 |
| Evaluation results |  |  |  |  |  |  |
| Melt flow index | g/10 min. | 9.7 | 18.2 | 20.3 | 2.8 | 4.5 |
| Modulus of flextural elasticity | kg/cm² | 9800 | 11700 | 10900 | 9400 | 10200 |
| Izod impact strength (−40° C.) | kg.cm/cm | 14.7 | 12.5 | 11.0 | 12.1 | 11.8 |
| Paintability: |  |  |  |  |  |  |
| Initial adherence | % | 100 | 100 | 100 | 100 | 100 |
| Warm water resistance* |  |  |  |  |  |  |
| Appearance of molding |  | no defect | no defect | no defect | no defect | no defect |

* : No changes were observed on the surfaces of moldings and coatings were not pulled off in the grid-patterned, pulling-off test.

EXAMPLES 4-9

Compounded were 65 wt. parts of a crystalline ethylene-propylene block copolymer (hereinafter abbreviated as "PP-F") having the ethylene content of 12.0 wt.%, polypropylene units insoluble in boiling n-heptane of 88.0 wt.%, the intrinsic viscosity of 1.5 as measured as a tetraline solution (135° C.) and the melt flow index of 20; 25 wt. parts of the above-described Tough- Tests were carried out in the same manner as in Example 4 except that, in place of the talc having the particle size of 1.8 μm, barium sulfate having the particle size of 1.2 μm, calcium carbonate having the particle size of 1.9 μm and calcium silicate having the particle size of 1.0 μm were compounded at their respective proportions given in Table 2. Test results are shown also in Table 2.

TABLE 2

|  |  | Example | | | | | | Comparative Example | | | | | | | |
|---|---|---|---|---|---|---|---|---|---|---|---|---|---|---|
|  | Unit | 4 | 5 | 6 | 7 | 8 | 9 | 3 | 4 | 5 | 6 | 7 | 8 | 9 | 10 |
| PP-F | wt. parts | 65 | 65 | 65 | 65 | 65 | 65 | 65 | 65 | 65 | 65 | 65 | 65 | 65 | 65 |
| EPM Toughmer P0280 | wt. parts | 25 | 25 | 25 | 25 | 25 | 25 | 25 | 25 | 25 | 25 | 25 | 25 | 25 | 25 |
| EPDM EP57P | wt. parts | 10 | 10 | 10 | 10 | 10 | 10 | 10 | 10 | 10 | 10 | 10 | 10 | 10 | 10 |
| Talc (particle size: 1.8 μm) | wt. parts | 2 | 3 | 5 |  |  |  | 0 | 1 | 7 | 15 | 20 |  |  |  |
| Talc (particle size: 3.3 μm) | wt. parts |  |  |  |  |  |  |  |  |  |  |  | 5 |  |  |
| Talc (particle size: 5.5 μm) | wt. parts |  |  |  |  |  |  |  |  |  |  |  |  | 5 |  |
| Talc (particle size: | wt. parts |  |  |  |  |  |  |  |  |  |  |  |  |  | 5 |

TABLE 2-continued

|  | Unit | Example 4 | 5 | 6 | 7 | 8 | 9 | Comparative Example 3 | 4 | 5 | 6 | 7 | 8 | 9 | 10 |
|---|---|---|---|---|---|---|---|---|---|---|---|---|---|---|---|
| 7.2 μm) | | | | | | | | | | | | | | | |
| BaSO$_4$ (particle size: 1.2 μm) | wt. parts | | | 5 | | | | | | | | | | | |
| CaCO$_3$ (particle size: 1.9 μm) | wt. parts | | | | 5 | | | | | | | | | | |
| Calcium silicate (p.s.: 1.0 μm) | wt. parts | | | | | 5 | | | | | | | | | |
| Melt flow index | g/10 min. | 9.2 | 8.9 | 8.4 | 8.3 | 8.5 | 8.7 | 10.3 | 9.7 | 8.1 | 7.5 | 7.3 | 8.4 | 8.7 | 8.1 |
| Modulus of Flextural elasticity | kg/cm$^2$ | 9100 | 9300 | 9600 | 8900 | 9100 | 10100 | 8500 | 8600 | 10000 | 12400 | 13300 | 9500 | 10000 | 9800 |
| Izod impact strength (−40° C.) | kg.cm/cm | 11.7 | 12.1 | 13.1 | 16.8 | 15.3 | 12.5 | 10.6 | 10.4 | 13.8 | 17.0 | 14.8 | 7.0 | 6.5 | 6.3 |
| Paintability: | | | | | | | | | | | | | | | |
| Initial adherence | % | 100 | 100 | 100 | 100 | 100 | 100 | 100 | 100 | 100 | 100 | 100 | 100 | 100 | 100 |
| Warm water resistance* | | | | | | | | | | Δ | X | X | | | |
| Appearance of molding | | | | | No defect | | | | | | Flashing | | | No defect | |

\* : No changes were observed on the surfaces of moldings and coatings were not pulled off in the grid-patterned, pulling-off test.
X: Swells were observed on the surfaces of moldings and coatings were pulled off in the grid-patterned, pulling-off test.
Δ: Swells were observed on the surfaces of moldings but coatings were not pulled off in the grid-patterned, pulling-off test.

EXAMPLE 10 AND COMPARATIVE EXAMPLES 11-15

The procedures of Example 4 were repeated except that PP-F, Toughmer P0280 (recited above), EP57P (recited above) and calcium carbonate having the particle size of 1.9 μm were compounded at their respective proportions given in Table 3 as a crystalline ethylene-propylene block copolymer, EPM, EPDM and filler respectively. Test results are shown also in Table 3.

TABLE 3

|  | Unit | Example 10 | Comparative Example 11 | 12 | 13 | 14 | 15 |
|---|---|---|---|---|---|---|---|
| Composition | | | | | | | |
| PP-F | wt. parts | 75 | 75 | 65 | 65 | 50 | 50 |
| EPM Toughmer P0280 | wt. parts | 5 | | 35 | | 50 | |
| EPDM EP57P | wt. parts | 20 | 25 | | 35 | | 50 |
| CaCO$_3$(particle size: 1.9 μm) | wt. parts | 5 | 5 | 5 | 5 | 5 | 5 |
| Evaluation results | | | | | | | |
| Melt index flow | g/10 min. | 7.0 | 6.5 | 11.2 | 3.9 | 8.3 | 1.8 |
| Modulus of flextural plasticity | kg/cm$^2$ | 9700 | 9600 | 8200 | 8400 | 5100 | 4900 |
| Izod impact strength (−40° C.) | kg.cm/cm | 12.3 | 12.5 | 7.4 | 14.6 | not broken | not broken |
| Paintability: | | | | | | | |
| Initial adherence | % | 100 | 70 | 100 | 80 | 100 | 90 |
| Warm water resistance* | | | X | | X | | X |
| Appearance of molding | | no defect | no defect | no defect | no defect | no defect | no defect |

\* , X: as defined in Table 2.

What is claimed is:

1. A polypropylene resin composition which comprises:
   (a) 80-60 wt.% of a crystalline ethylene-propylene block copolymer having an ethylene content of 11-30 wt.%, polypropylene units insoluble in boiling n-heptane of 75 wt.% or more, an intrinsic viscosity of 1.2-2.0 as measured as a tetraline solution (135° C.) and a melt flow index of 8 or greater;
   (b) 5-35 wt.% of an ethylene-propylene copolymer rubber having a propylene content of 20-50 wt.% and a Mooney viscosity (ML$_{1+4}$, 100° C.) of 20-100;
   (c) 5-35 wt.% of an ethylene-propylene-diene terpolymer having a propylene content of 20-50 wt.% and a Mooney viscosity (ML$_{1+4}$, 100° C.) of 20-110, said diene being ethylidene norbornene, dicyclopentadiene or 1,4-hexadiene; and
   (d) 2-5 wt.% based on the total weight of the above resin components (a), (b) and (c) of an inorganic filler having a particle size of 3 μm or smaller.

2. The composition as claimed in claim 1, wherein the sum of the ethylene-propylene copolymer rubber and ethylene-propylene-diene terpolymer amounts to 20-40 wt.% of the total weight of the resin components (a), (b) and (c).

3. The composition as claimed in claim 1, wherein the particle size of the inorganic filler is 2 μm or smaller.

4. The composition as claimed in claim 1, wherein the inorganic filler is selected from the group consisting of calcium and magnesium oxides, hydroxides, carbonates and silicates; calcium and barium sulfates; aluminum hydroxide; basic magnesium carbonate; calcium sulfite; talc; clay; dolomite; pirssonite; and glass.

5. The composition as claimed in claim 1, wherein the inorganic filler is selected from the group consisting of calcium carbonate, barium sulfate, calcium silicate and talc.

* * * * *